June 9, 1925.
P. M. WILDGRUBE
DISK SHARPENER
Filed June 3, 1924
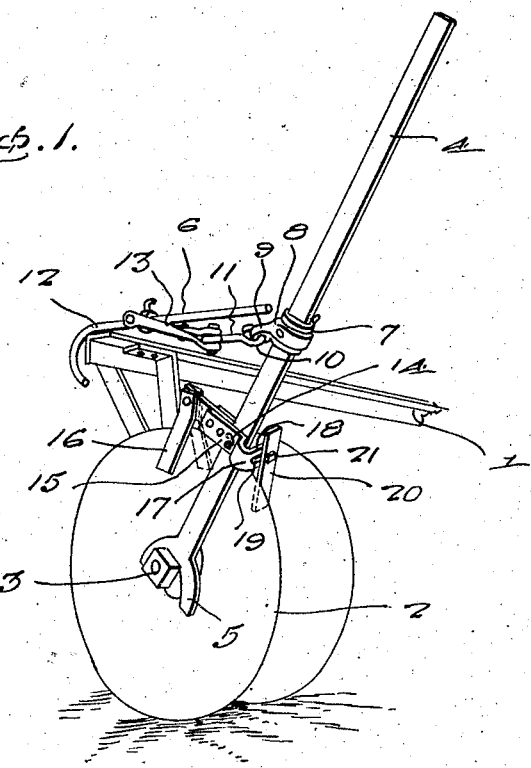
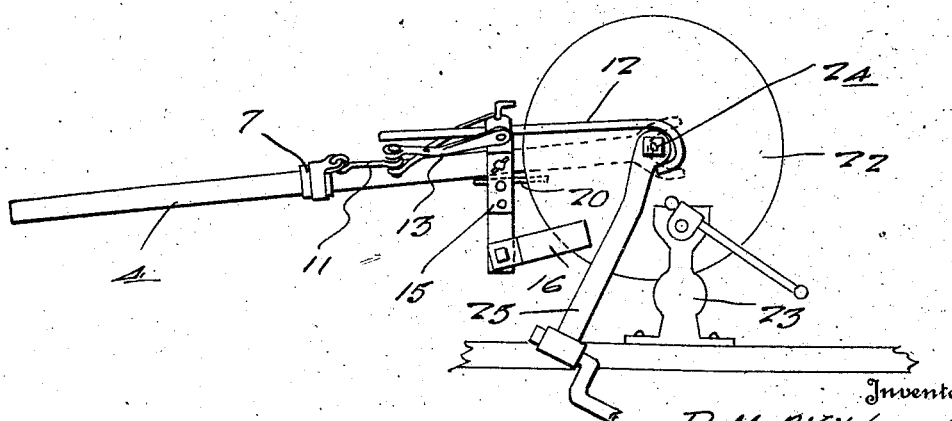
Inventor
P. M. Wildgrube
By Clarence A. O'Brien
Attorney

Patented June 9, 1925.

1,540,827

UNITED STATES PATENT OFFICE.

PAUL M. WILDGRUBE, OF SYCAMORE, KANSAS.

DISK SHARPENER.

Application filed June 3, 1924. Serial No. 717,567.

*To all whom it may concern:*

Be it known that I, PAUL M. WILDGRUBE, a citizen of the United States, residing at Sycamore, in the county of Montgomery and State of Kansas, have invented certain new and useful Improvements in a Disk Sharpener, of which the following is a specification.

This invention relates to new and useful improvements in sharpening means for disk harrows or cultivators and has for its principal object to provide a simple and efficient device which may be readily placed in position on a disk harrow or cultivator for sharpening each disk while the agricultural implement is in use and without interfering with the operation thereof.

A further object of the invention is to provide a disk sharpener of the above mentioned character, which will automatically sharpen the cutting edge of each disk while the same is in operation thus saving considerable time and labor.

A still further object of the invention is to provide a disk sharpener of the above mentioned character, wherein means is provided for detachably supporting the same in position on the cultivator or harrow so that the device may be readily detached from one disk and placed in position for cooperation with another disk of the agricultural implement.

A further object of the invention is to provide a detachable sharpening device of the above mentioned character, which may also be used in sharpening disks which are removed from the agricultural implement and are secured in a rigid position in a vise or the like. A further object of the invention is to provide a device of the above mentioned character, which is simple in construction, inexpensive, strong and durable and well adapted to the purposes for which it is designed.

Other objects and advantages of this invention will become apparent during the course of the following description.

In the accompanying drawing forming a part of this specification and in which like numerals designate like parts throughout the same:

Figure 1 is a perspective view of my sharpening device showing the same in use.

Figure 2 is a side elevation thereof showing the same in conjunction with a disk which is supported in a vise.

In the drawing wherein for the purpose of illustration is shown the preferred embodiment of my invention, the numeral 1 designates a portion of the frame of a cultivator or harrow and the usual rotary disks such as illustrated at 2 are supported on the shaft 3 in the usual manner. In order that the cutting edges of the rotary disks 2 may be sharpened without having to remove the same from the shaft 3 and also to resharpen the cutting edges while the agricultural implement is in use, I provide a structure which is shown in Figure 1 of the drawing.

The sharpening device comprises an elongated lever 4 which has its lower end forked as illustrated at 5 to engage the shaft 3 on one side of the disk 2 which is to be sharpened and the same is supported in position by means of the clamping means illustrated generally by the numeral 6. The clamping means comprises a collar 7 which is adapted for longitudinal adjustment on the intermediate portion of the lever. A collar 8 is supported on the sleeve 7 and is provided with an eye portion 9 for receiving the hook end 10 of a link 11. A clamping hook 12 is connected to the opposite end of the link 11 by means of the clevis 13 and the curved portion of the hook 12 is adapted for engagement with the frame of the cultivator or harrow in the manner clearly illustrated in Figure 1. In this manner the lever 4 will be supported in position against accidental displacement from the shaft 3 and the frame of the agricultural implement.

Adjustably supported on the lower portion of the lever 4 by means of the thumb screw 14 is the transversely extending arm 15. Supported on one end of the arm 15 are the guide members 16 and the same are disposed downwardly in diverging relation so as to extend on opposite sides of the cutting edge of the cultivator disk in the manner clearly illustrated in the drawing. The opposite end of the arm 15 is curved as illustrated at 17 and then disposed laterally as illustrated at 18 and the lateral portion is provided with a longitudinally extending slot 19. The sharpening member 20 is adapted to be supported on the lateral extension 18 by means of the adjusting nut 21 which is receivable in the longitudinal slot 19 and the purpose thereof is to provide a means whereby the sharpening member may be disposed at any desired angle or pitch.

By providing a device of the construction as illustrated in Figure 1, each cutter disk of the argicultural implement may be sharpened without necessitating the removal of the disk from the shaft which supports the same and as the cultivator or harrow is in operation, the sharpening member 20 will automatically sharpen the cutting edge of the disk with which the same is in engagement, and the device will further be self supporting and will not necessitate the holding of the device while in use. The attachment is further of such a construction as to enable the parts to be readily disassembled so that the same may be held from engagement with one disk and placed into engagement with the adjacent disk whereby all of the disks may be sharpened in a comparatively simple and efficient manner.

In Figure 2 of the drawing, the sharpening device is illustrated in conjunction with a plow coulter 22 wherein the latter is supported in a suitable vise or clamp 23 and held in a rigid position. The shaft 24 on which the disk 22 is supported is not removed as is also the supporting standard 25. In sharpening the cutting edge of the disk 22 when the disk is supported in the vise, the forked end of the lever engages the shaft 24 on one side of the disk while the clamping hook 12 is swung into engagement with the shaft on the opposite side of the disk and when the parts are arranged as shown in Figure 2 of the drawing, by moving the outer free end of the lever 4 upwardly and downwardly, the sharpening member 20 is adapted to engage the cutting edge of the disk and sharpen the same. It is of course to be understood that the clamping hook 12 and the forked end 5 of the lever 4 will provide a pivotal support for the lever to permit the free swinging movement thereof.

It will thus be seen from the foregoing description, that a sharpening device for rotary cutter disks has been provided which is simple in construction, inexpensive, strong and durable and the parts further so arranged as to enable the same to be readily adjusted to any desired position.

When the device is used in connection with agricultural implements for sharpening the cutter disks thereof the sharpening member will not interfere with the proper operation of the cutter disks and will save considerable time and labor in resharpening the cutting edges of the disk.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. Means for sharpening a disk comprising an elongated lever, one end thereof being forked for engagement with the shaft of the disk, an arm supported on said lever, a sharpening member supported on said arm and adapted for engagement with the cutting edge of said disk, a sleeve slidable on the lever, a collar fixed to the sleeve and provided with an eye, a series of links attached to the eye at one end, and a clamping hook attached at its intermediate portion to the series of links and adapted to engage the frame of the supporting structure of the disk and shaft.

2. Means for sharpening a disk including an elongated lever, one end thereof being forked for engagement with the shaft of the disk, an arm supported on said lever, a sharpening member supported on said arm and adapted for engagement with the cutting edge of the disk, a clamping hook for supporting said lever in an operative position, and flexible means connecting the intermediate portion of said hook with an intermediate portion of said lever.

In testimony whereof I affix my signature.

PAUL M. WILDGRUBE.